INVENTOR.
Leo Goldman

June 14, 1966     L. GOLDMAN     3,255,839
STEER DRIVE AXLE WITH INTERNAL SEAL
Original Filed Feb. 5, 1963     5 Sheets-Sheet 2

INVENTOR
Leo Goldman

BY
Strauch, Nolan & Neale
ATTORNEYS

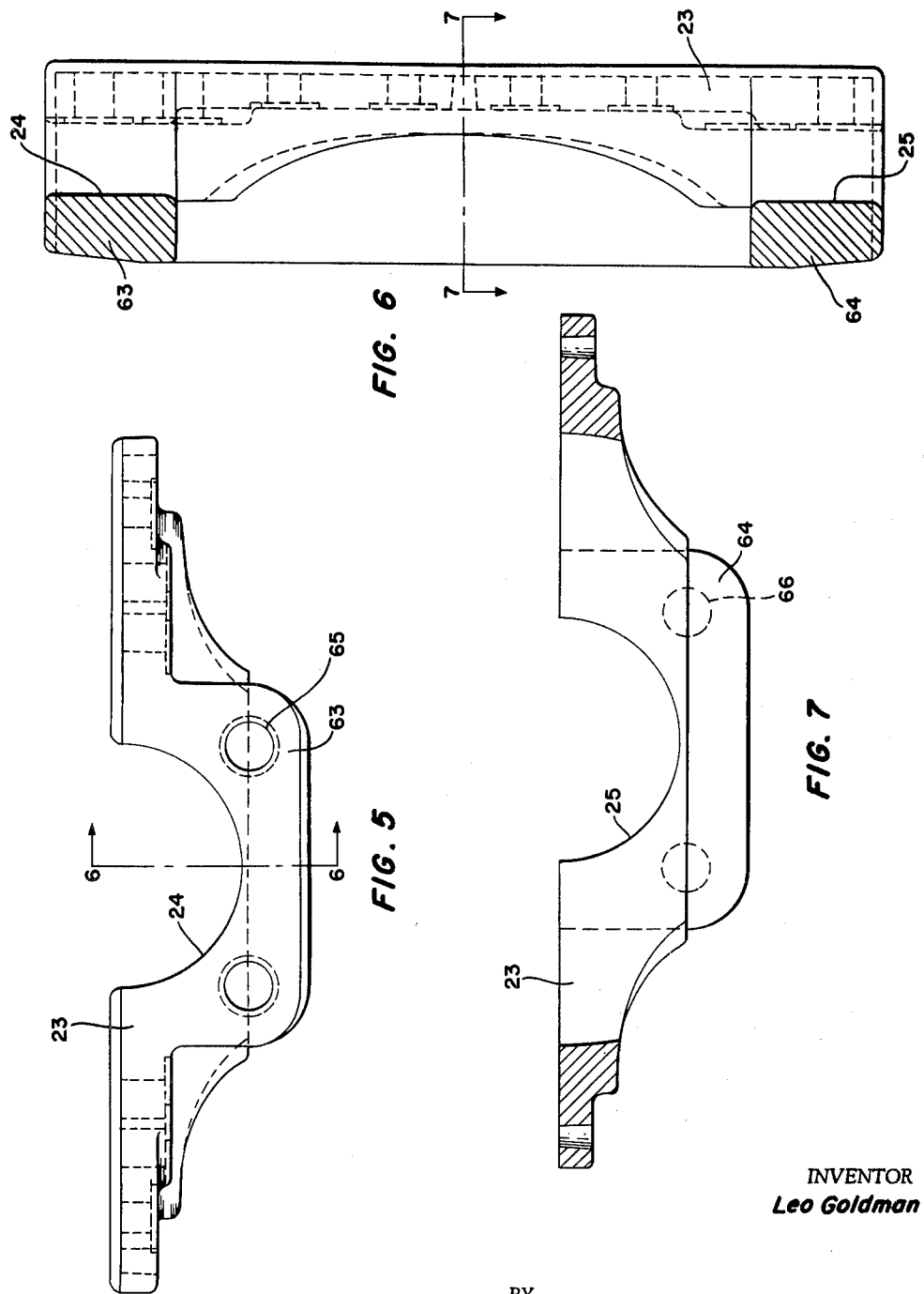

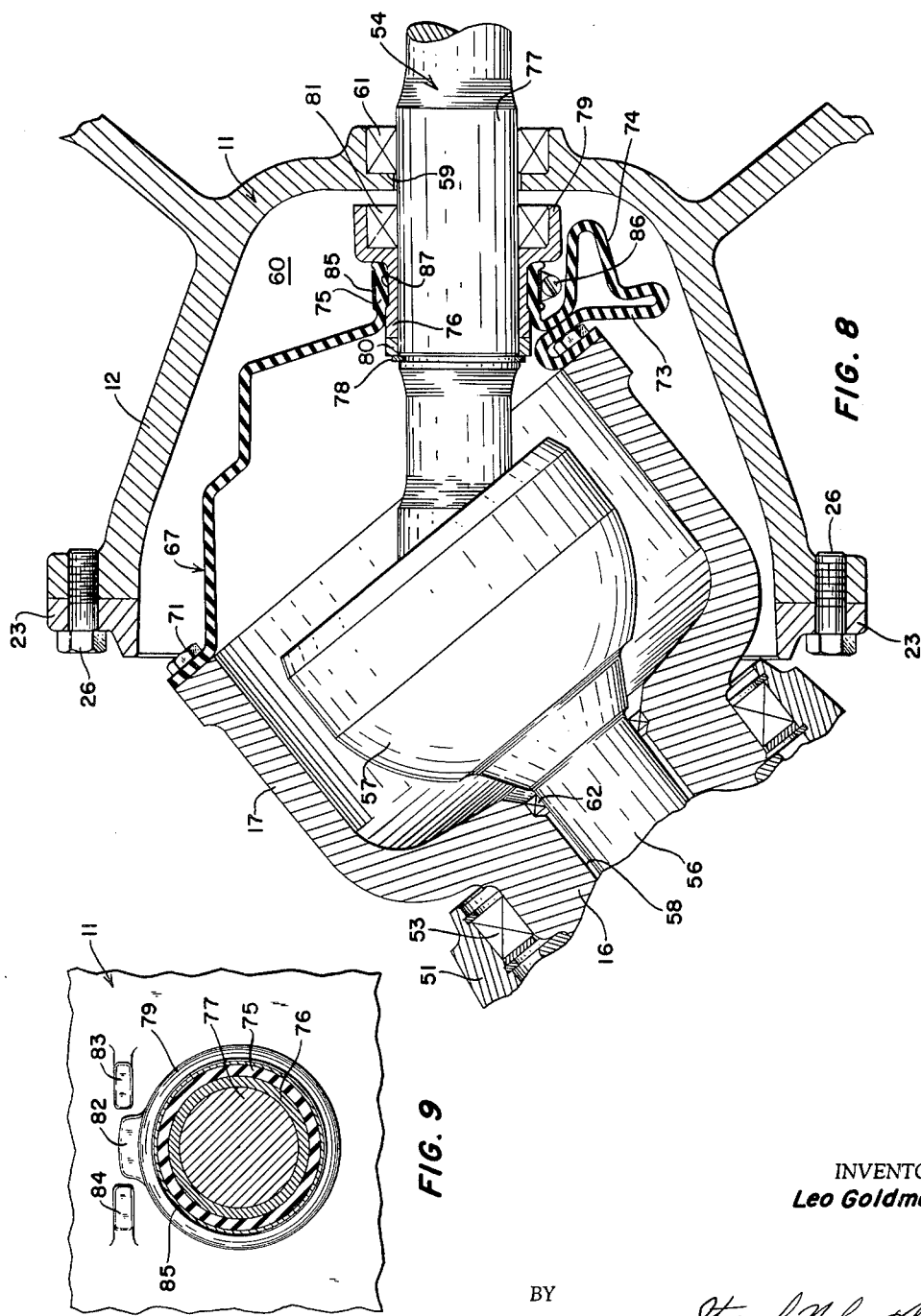

United States Patent Office 3,255,839
Patented June 14, 1966

3,255,839
STEER DRIVE AXLE WITH INTERNAL SEAL
Leo Goldman, Windsor, Ontario, Canada, assignor to Rockwell-Standard Corporation, Pittsburgh, Pa., a corporation of Delaware
Original application Feb. 5, 1963, Ser. No. 256,325. Divided and this application Dec. 3, 1964, Ser. No. 415,668
9 Claims. (Cl. 180—43)

This is a division of my copending application Serial No. 256,325 filed February 5, 1963 for Steer Drive Axle With Internal Seal.

This invention relates to steer drive axles and is particularly concerned with the structural relationship of parts at the axle ends and sealing arrangements therefor.

Prior to the invention known steer drive axle assemblies comprised at opposite ends bell-like housings having generally vertical external trunnions on which was journalled a wheel mounting spindle having a corresponding bell-like housing extending over the axle housing end and journalled on the trunnions. During steering of the vehicle the spindle swings a limited amount in either direction about the common axis of the trunnions. An enlarged space is thus provided within the bell-like housings to receive the universal joint structure of the drive axle shaft assembly which extends through the axle housing and the spindle to drive the wheel mounted on the spindle.

The present invention provides an unexpectedly improved axle outer end structure wherein the spindle is journalled on internal trunnions in the enlarged outer end of an axle housing and special internal sealing arrangements are provided, preferably between the inner end of the spindle and the axle shaft assembly.

Prior to the invention, where the enlarged spindle inner end extended over the axle outer end, annular external flexible sealing members have been used, to keep out dirt and moisture and prevent the escape of lubricant, but such seals were exposed for physical damage and deterioration. In these prior axle structures internal seals were not possible as a practical matter, and internal seals were almost impossible to provide in such structures where the steering requirements involved a 35° turning angle in both directions.

It is the major object of the invention to provide a novel steer drive axle structure wherein the wheel mounted spindle is journalled on trunnions internally of enlarged axle housing ends, and a novel seal may be provided between the spindle and the axle shaft.

Another object of the invention is to provide a steer drive axle assembly wherein the axle housing has an outwardly open enlarged end portion and the inner end of the wheel mounting spindle has turnnions rigid therewith and extending outwardly to be journalled in said housing end portions.

A further object of the invention is to provide a novel steer drive axle assembly wherein a novel adapter retains trunnions on the inner end of the wheel mounting spindle onto the enlarged outer end of an axle housing.

It is a further object of the invention to provide a novel steer drive axle assembly wherein the enlarged outer end of the axle housing is formed with trunnion received recesses for receiving trunnions on the inner end of a wheel mounting spindle, and an annular adapter also recessed to receive said trunnion mount said spindle in the assembly.

Another object of the invention is to provide a novel internal seal for a steer drive axle end structure.

It is a further object of the invention to provide a steer drive axle assembly wherein the inner end of the wheel mounting spindle is journalled within the end of the axle housing and a novel annular flexible seal effective in all relative angular displacements of the spindle and housing is mounted on the inner end of the wheel mounting spindle. In the form of the invention herein disclosed this seal is of generally bellows structure with special attachment to the axle shaft assembly inwardly of the universal joint.

Further objects of the invention will appear as the description proceeds in connection with the appended claims and the annexed drawings wherein;

FIGURE 5 is an elevation view of the trunnion adapter;

FIGURE 6 is a section on line 6—6 of FIGURE 5;

FIGURE 7 is a section on line 7—7 of FIGURE 6;

FIGURE 8 is a sectional view of the steer drive axle structure of FIGURE 1 taken in a plane at right angles to that of FIGURE 1 and showing in plan the axle and seal structure when the wheel has been turned for steering of the vehicle; and FIGURE 9 is a section on line 9—9 of FIGURE 1 showing seal structure detail.

Figure 1:
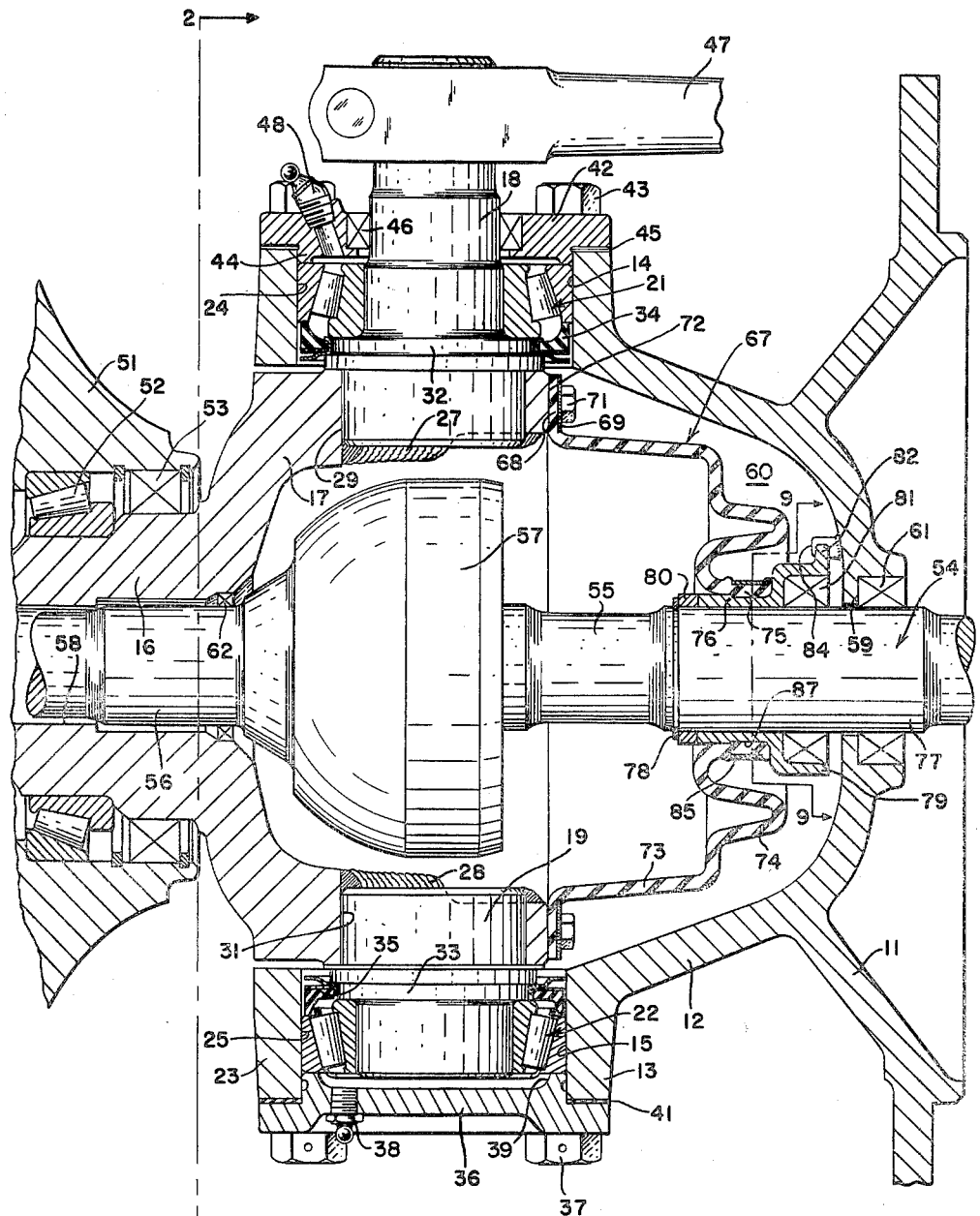
FIGURE 1 is a section through a steer drive axle assembly according to a preferred embodiment of the invention, showing novel axle structure and a special sealing arrangement.

Referring to FIGURES 1–9, an axle housing 11 non-rotatably connected to a vehicle frame, as by springs (not shown), is formed with an enlarged substantially semi-spherical bell-like outer end portion 12 having an axially outward opening surrounded by a trunnion flange 13.

Flanke 13 (FIGURES 1 and 4) has substantially vertically aligned upper and lower recesses 14 and 15 that face axially outwardly. A wheel mounting spindle 16 has an enlarged substantially semispherical bell-like inner end 17 having an axially inward opening. Rigid with the wheel mounting spindle are opositely projecting upper and lower trunnions 18 and 19 which extend into tapered roller bearing assemblies 21 and 22 respectively seated in housing recesses 14 and 15. A generally annular trunnion adapter plate 23, where is formed with upper and lower trunnion bearing receiving recesses 24 and 25 (FIGURES 1 and 6) is secured upon trunnion flange 13 of the axle housing as by a series of stud bolts 26 (FIGURE 2).

Figure 2:
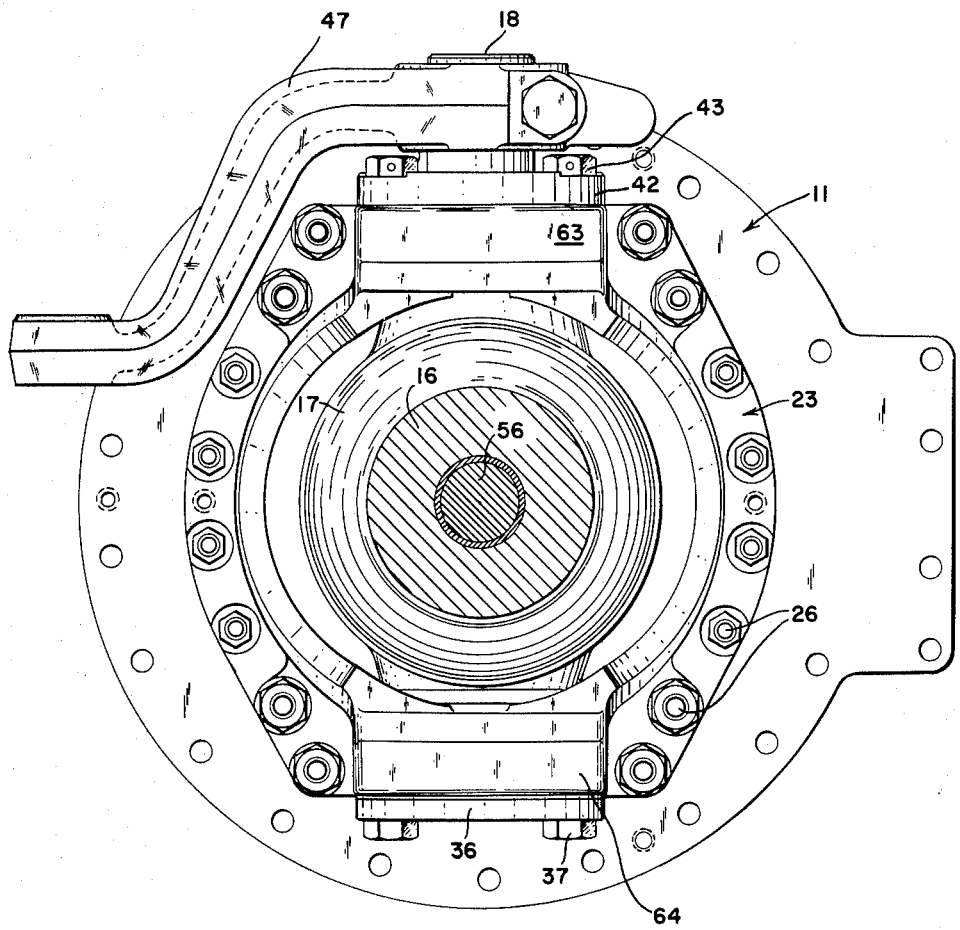
FIGURE 2 is a section on line 2—2 of FIGURE 1 showing further structural detail.

As shown in FIGURE 1, trunnions 18 and 19 are cylindrical and are welded at 27 and 28 respectively to the wheel spindle at their extreme inner ends where they project from vertically aligned bores 29 and 31 respectively. The trunnions 18 and 19 are shouldered at 32 and 33 respectively to mount similar grease seals 34 and 35 that act essentially to retain lubricant in the spaces around bearings 21 and 22.

Across the lower end of the bottom trunnion bearing recess 15, 25 a closure plate 36 is secured as by bolts 37, and a grease fitting 38 enables lubrication of the bearing 22.

Internally plate 36 has a flange 39 piloted within the trunnion bearing recess and axially abutting the outer race of bearing 22. The inner race of bearing 22 abuts trunnion shoulder 33, so that plate 36 loads bearing 22 and the thickness of the sealing and/or shim assembly at 41 may determine the bearing loading.

Similarly the upper end of upper trunnion bearing recess 14, 24 is closed by an annular plate 42 secured to the axle housing as by bolts 43. Here the inner plate flange 44 abuts the outer race of bearing 21 and the inner race of bearing 21 abuts trunnion shoulder 32, with sealing means and/or shims at 45 to determine the bearing loading.

A grease seal 46 is provided between plate 42 and the upper end of trunnion 18 projecting therethrough, and a steering arm 47 is fixed by means of serrations or the like on trunnion 18. A grease fitting 48 enables lubrication of bearing 21. When arm 47 is rocked, as by the usual drag link (not shown), the wheel spindle rocks about the common vertical axis of trunnions 18 and 19. By vertical I mean to include slight angular departures from true vertical, as for usual front wheel caster and camber in conventional king pin practice.

In FIGURE 1, the ground engaging wheel 51 is rotatably mounted by bearings 52 on the wheel mounting spindle 16, and a grease retainer seal 53 is provided between them.

A drive shaft assembly 54 comprising a driven inner shaft section 55, an outer stub shaft section 56 non-rotatably connected to the wheel 51 by usual means (not shown) and a universal joint 57 in the enlarged space 60 enclosed by the housing outer end portion 12 and the spindle inner end portion 17. Universal joint 57, details of which are not shown, is preferably of any conventional type like that disclosed in Keese Patent No. 1,995,987 with its center of turning lying in the common axis of trunnions 18 and 19 in the assembly.

Figure 4:
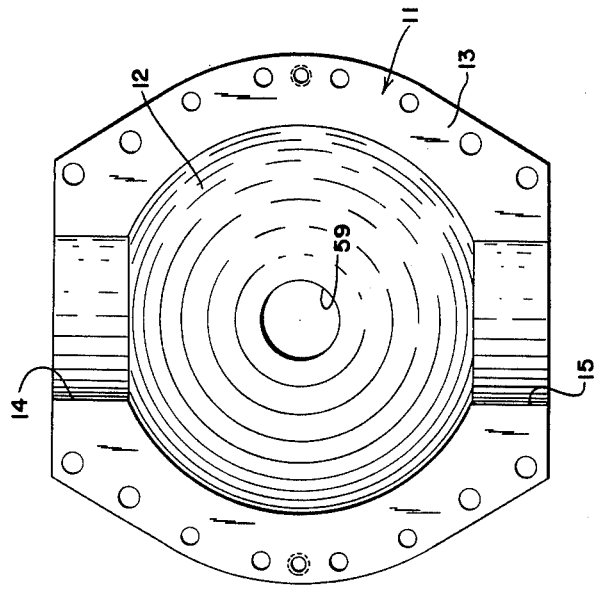
FIGURE 4 is an end view of the axle housing showing the trunnion flange to which the adapter is secured.
Figure 3:
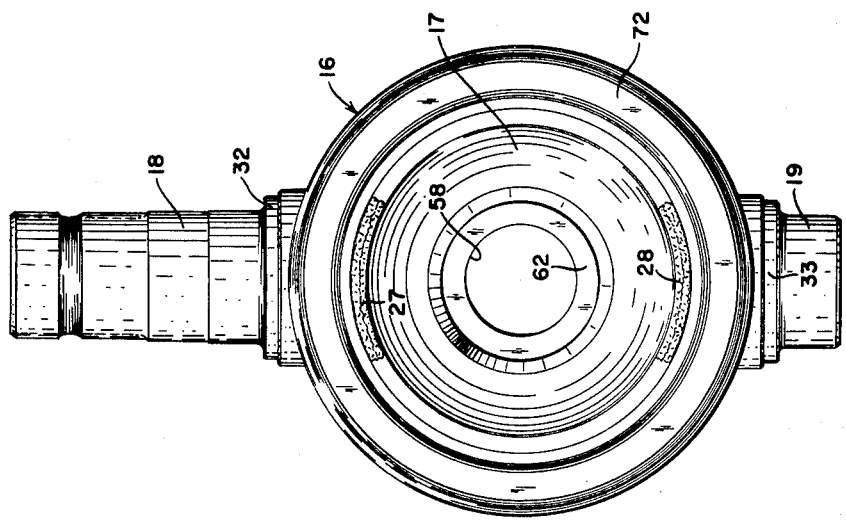
FIGURE 3 is an end view of the spindle assembly with the trunnions in place.

Referring to FIGURES 3 and 4, it will be noted that the spindle 16 has a central bore 58 through which freely extends stub shaft section 56, and the axle housing 11 has a central bore 59 through which freely extends drive shaft section 56. Suitable seals are provided at 61 and 62 between the drive shaft sections and the axle housing and spindle respectively.

It will be noted that the adapter plate 23 is formed with upper and lower bosses 63 and 64 (FIGURES 2 and 5–7) where the trunnion bearing receiving recesses 24 and 25 are provided. Upper boss 63 has threaded bores 65 for receiving the outer bolts 43, and lower boss 64 has threaded bores 66 to receive the outer bolts 37, so that the upper and lower closure plates 36 and 42 are bolted to both the axle housing and adapter plate to help hold them in rigid assembly.

Referring now to FIGURES 1, 8 and 9 one form of internal seal 67 is shown, as supplementary to the protective action of conventional seals 61 and 62.

In this embodiment the seal 67 is a flexible boot-type seal comprising an annulus of flexible synthetic rubber or the like of approximate bell shape with its larger end formed to an annular radial flange 68 which is secured tightly upon and over the inner end of spindle 16, as by a stiff metal clamping ring 69 and a series of machine screws 71 whereby flange 68 is sealingly compressed against the flat annular end face 72 of the spindle.

Seal 67 extends inwardly from the spindle 16 as a tubular body 73 to a pleated or bellows-like end section 74 centrally formed with a tubular small diameter boss 75 snugly surrounding a metal sleeve 76 which is snugly rotatably and slidably mounted on the smooth cylindrical section 77 of drive shaft 54. Outward displacement of sleeve 76 is prevented by abutment with a relatively stationary wear ring 80 that is press fitted upon shaft 54, and at its outer end wear ring 80 abuts a snap ring 78 axially fixed on the drive shaft. Inward displacement of sleeve 76 is effectively limited by the axle housing.

Sleeve 76 has its larger inner end 79 enlarged to mount a suitable compression seal 81 that has rotatable and slidable running contact with the shaft surface at 77. A radial projection 82 on sleeve 76 extends between two fixedly spaced projections 83 and 84 (FIGURE 9) on the axle housing wall, to thereby prevent rotation of the sleeve 76 with the drive shaft.

The inner end of seal 67 is clamped upon sleeve 76 by a flexible metal strap 85 surrounding boss 75 and drawn tight by a screw at 86 (FIGURE 8). Note that sleeve 76 is grooved at 87 so that the compressed material of boss 75 is deformed thereinto and forms an axial lock with the sleeve as well as a fluid tight seal.

Effectively therefore the annular seal 67 is fixed upon and over the inner end of spindle 16 and has a relatively rotatable and slidable fluid tight seal connection with the drive shaft axially inwardly of the universal joint of the drive shaft. This prevents any dust or dirt from penetrating the universal joint housing at 57.

FIGURE 8 shows the structure of FIGURE 1 when the ground engaging wheel has been turned up to its limit of about 35° during steering. It will be noted that the seal 67 maintains its effectiveness entirely during all of this turning and without interfering either with the steering or the drive shaft rotation. Actually the seal end wall 74 merely expands at one side and collapses on the other as illustrated in FIGURE 8, and the limited slidable rotatable mounting of sleeve 76 on the drive shaft permits whatever slight sliding and/or rotating may be necessary to prevent binding with the shaft.

In the invention, the internal seal mounted on the spindle end is protected by the surrounding rigid axle housing against injury by foreign objects such as sharp stones flung up from the roadway and effectively shielded against damaging fluids.

The illustrated structure is the same at each end of the transverse housing 11.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a steer drive axle, a nonrotatable axle housing having an axially outwardly open outer end, a wheel mounting spindle having its inner end disposed within said axle housing end, substantially vertical trunnion means mounting said spindle for turning movement on said axle housing, a drive axle assembly extending through said axle housing having a universal joint section disposed within the inner end of said spindle and a stub shaft section extending outwardly through said spindle, a flexible annular internal seal having its axially outer end attached to said spindle and its axially inner end slidably rockably supported on said drive axle assembly within said housing outer end axially inwardly of said universal joint section, and cooperating means on said housing outer end and said axially inner end of said seal for positively limiting rotation of said axially inner end of the sleeve with respect to said drive axle assembly.

2. In the steer drive axle assembly defined in claim 1, said flexible seal being a boot-type bell shaped annulus of synthetic rubber with its larger end secured on said spindle and its smaller end mounted on said drive axle assembly.

3. In a steer drive axle assembly wherein the inner end of a wheel bearing spindle is trunnioned within the enlarged outer end of an axle housing through which extends a drive axle shaft, the provision of an internal seal comprising an annular flexible seal member surrounding the drive axle shaft having its axially outer end secured to said spindle, and means for supporting the axially inner end of said seal member directly on said drive axle shaft comprising a sleeve relatively rotatably mounted on said drive axle shaft and means for attaching the seal member upon said sleeve, and cooperating stop means on said housing and sleeve for preventing rotation of said sleeve with the axle shaft.

4. In the steer drive axle assembly defined in claim 3, said sleeve being mounted for limited axial sliding on said drive axle shaft.

5. In the steer drive axle assembly defined in claim 4, a wear ring on said drive axle shaft axially abutting the axially outer end of said sleeve.

6. In the steer drive axle assembly defined in claim 4, means providing an annular fluid tight seal between said drive axle shaft and the sleeve rotatably and slidably supported thereon.

7. In a steer drive axle, a non-rotatable axle housing having an axially outwardly open outer end, a wheel mounting spindle having its inner end disposed within said axle housing end, substantially vertical trunnion means mounting said spindle for turning movement on said axle housing, a drive axle assembly extending through said axle housing having a universal joint section disposed within the inner end of said spindle and a stub shaft section extending outwardly through said spindle, and a flexible annular internal seal having its axially outer end attached to said spindle and its axially inner end slidably rockably supported on said drive axle assembly axially inwardly of said universal joint section, the support of said flexible seal annulus on said drive axle assembly comprising a sleeve freely rotatably and slidably mounted on said drive axle assembly, and cooperating means on the sleeve and housing limiting rotation of said sleeve.

8. In the steer drive axle defined in claim 7, said drive axle assembly comprising a cylindrical surface shaft rotatably supporting said sleeve, and a fluid tight running seal between said sleeve and shaft surface.

9. A steer drive axle assembly of the type wherein a non-rotatable axle housing has an enlarged outwardly open outer end and a wheel mounting spindle has an enlarged inwardly open inner end disposed within the axle outer end and rockably mounted thereon by upper and lower trunnions rigid with the spindle and extending rotatably into bearings carried by the axle outer end and a drive axle assembly extends through the axle housing with a universal joint section in alignment with the trunnions and a stub axle section projecting through the spindle for drive connection to a wheel, characterized by said axle outer end being formed with outwardly open upper and lower recesses mounting the trunnion bearings, an annular retainer member surrounding said spindle and secured to said axle outer end to retain said bearings in said recesses, an outer annular seal between the interior of said hollow spindle and said stub shaft, an internal flexible seal annulus secured at its axially outer end on said inner end of said spindle within the space enclosed by the housing outer end, a sleeve relatively rotatably mounted on said drive axle within said housing outer end axially inwardly of said universal joint section, means securing the axially inner end of said seal annulus to said sleeve, and cooperating positive stop means in said axle housing outer end and said axially inner end of said seal annulus for preventing rotation of said sleeve with said drive axle.

References Cited by the Examiner

UNITED STATES PATENTS

| 1,387,967 | 8/1921 | Dussean et al. | 180—48 |
| 1,734,709 | 11/1929 | Bayley | 180—48 |

FOREIGN PATENTS

| 712,018 | 9/1931 | France. |
| 9,751 | 12/1909 | Great Britain. |
| 442,343 | 2/1936 | Great Britain. |
| 460,990 | 5/1937 | Great Britain. |
| 826,440 | 1/1960 | Great Britain. |

A. HARRY LEVY, *Primary Examiner.*